(12) United States Patent
Wang et al.

(10) Patent No.: US 10,150,468 B2
(45) Date of Patent: *Dec. 11, 2018

(54) STEP-RATIO TRANSMISSION CONTROL FOR A HYBRID VEHICLE

(71) Applicant: Ford Global Technologies, LLC, Dearborn, MI (US)

(72) Inventors: Xiaoyong Wang, Novi, MI (US); Wei Liang, Farmington Hills, MI (US); Ming Lang Kuang, Canton, MI (US); Rajit Johri, Ann Arbor, MI (US); Daniel Scott Colvin, Farmington Hills, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/496,215

(22) Filed: Apr. 25, 2017

(65) Prior Publication Data

US 2017/0225675 A1 Aug. 10, 2017

Related U.S. Application Data

(63) Continuation of application No. 14/247,389, filed on Apr. 8, 2014, now Pat. No. 9,637,114.

(51) Int. Cl.
*B60W 20/30* (2016.01)
*B60W 10/08* (2006.01)
(Continued)

(52) U.S. Cl.
CPC ............... *B60W 20/30* (2013.01); *B60K 6/48* (2013.01); *B60K 6/547* (2013.01); *B60W 10/06* (2013.01);
(Continued)

(58) Field of Classification Search
CPC ...... B60W 20/30; B60W 10/08; B60W 10/11; B60W 10/111; F16H 61/0213
See application file for complete search history.

(56) References Cited

U.S. PATENT DOCUMENTS 3,053,051 A 9/1962 Kelley
5,890,509 A 4/1999 Becker et al.
(Continued)

OTHER PUBLICATIONS

Chinese Office Action for Chinese Application No. 201510253430.9 dated May 3, 2018.
(Continued)

*Primary Examiner* — Jacob S. Scott
*Assistant Examiner* — Tinh Dang
(74) *Attorney, Agent, or Firm* — David B. Kelley; Brooks Kushman P.C.

(57) ABSTRACT

A shift strategy is provided for a hybrid electric vehicle to cause a speed of a motor to approach a target motor speed to increase fuel economy for an engine operating in a hybrid drive mode. A controller shifts the transmission according to a magnitude of a driver torque demand, the current rotor or impeller speed, and whether the motor is consuming or producing current. The controller shifts the transmission according to one shift schedule when the motor is motoring, and according to another shift schedule when the motor is generating power.

9 Claims, 3 Drawing Sheets

(51) Int. Cl.
*B60W 10/11* (2012.01)
*F16H 61/02* (2006.01)
*B60K 6/547* (2007.10)
*B60W 10/26* (2006.01)
*B60K 6/48* (2007.10)
*B60W 10/06* (2006.01)
*B60W 30/188* (2012.01)
*B60W 20/10* (2016.01)
*B60W 20/13* (2016.01)

(52) U.S. Cl.
CPC ............ *B60W 10/08* (2013.01); *B60W 10/11* (2013.01); *B60W 10/26* (2013.01); *B60W 20/10* (2013.01); *B60W 20/13* (2016.01); *B60W 30/1882* (2013.01); *F16H 61/0213* (2013.01); *B60W 2510/0657* (2013.01); *B60W 2510/081* (2013.01); *B60W 2510/083* (2013.01); *B60W 2510/244* (2013.01); *B60W 2520/10* (2013.01); *B60W 2540/10* (2013.01); *B60W 2710/0644* (2013.01); *B60W 2710/0666* (2013.01); *B60W 2710/081* (2013.01); *B60W 2710/083* (2013.01); *B60W 2710/1005* (2013.01); *F16H 2061/0227* (2013.01); *F16H 2061/0232* (2013.01); *Y02T 10/6221* (2013.01); *Y02T 10/6286* (2013.01); *Y10S 903/93* (2013.01); *Y10S 903/945* (2013.01); *Y10T 477/23* (2015.01)

(56) References Cited

U.S. PATENT DOCUMENTS

| | | | |
|---|---|---|---|
| 6,044,645 | A | 4/2000 | Greenan et al. |
| 6,819,985 | B2 | 11/2004 | Minagawa et al. |
| 6,867,509 | B1 | 3/2005 | Takaoka et al. |
| 7,101,308 | B2 | 9/2006 | Joe et al. |
| 7,463,962 | B2 | 12/2008 | Brunemann et al. |
| 7,673,714 | B2 | 3/2010 | Soliman et al. |
| 7,946,951 | B2 | 5/2011 | Kimura et al. |
| 8,126,624 | B2 | 2/2012 | Heap et al. |
| 8,192,325 | B2 | 6/2012 | Matsubara et al. |
| 8,296,027 | B2 | 10/2012 | Heap et al. |
| 8,306,682 | B2 | 11/2012 | Gray, Jr. |
| 8,534,399 | B2 | 9/2013 | Soliman et al. |
| 9,008,926 | B2 | 4/2015 | Heap et al. |
| 2007/0275819 | A1* | 11/2007 | Hirata .................... B60K 6/365 477/5 |
| 2008/0149407 | A1* | 6/2008 | Shibata .................. B60K 6/365 180/65.27 |
| 2012/0183391 | A1 | 7/2012 | Czechowski et al. |
| 2013/0297162 | A1 | 11/2013 | Dai et al. |
| 2013/0331227 | A1* | 12/2013 | Kato ........................ B60K 6/48 477/3 |
| 2015/0051767 | A1 | 2/2015 | Mohri |

OTHER PUBLICATIONS

Chinese Office Action for Chinese Patent Application No. 201510253430.9 dated May 3, 2018.

* cited by examiner

STEP-RATIO TRANSMISSION CONTROL FOR A HYBRID VEHICLE

CROSS-REFERENCE TO RELATED APPLICATIONS

This application is a continuation of U.S. application Ser. No. 14/247,389 filed Apr. 8, 2014, the disclosure of which is hereby incorporated in its entirety by reference herein.

TECHNICAL FIELD

This disclosure relates to automatic transmission gear ratio management for a traditional parallel hybrid vehicle utilizing both power sources, and more specifically to management of an engine speed to move toward a target speed, based on a motor speed, for energy efficiency without impairing drivability of the vehicle.

BACKGROUND

Hybrid vehicles are vehicles with two or more power sources in a drivetrain. The most common automotive hybrid being a gasoline-electric hybrid, having an internal combustion engine and an electric motor/generator. Typically hybrids use both an engine and a motor to improve fuel consumption, emission, and performance by switching between the two at optimal times when either the engine or the motor may be more efficient than the other, or in a combination of the two when it is more efficient than the use of only one, depending on the hybrid system and vehicle mode.

Hybrid vehicles are generally classified by the division of power between sources; both sources may operate in parallel to simultaneously provide acceleration or they may operate in series with one source exclusively providing the acceleration and the second being used to augment the first's power reserve.

Series hybrids, also referred to as extended-range electric vehicles or range-extended electric vehicles, are designed to be run mostly by a motor, but have a gasoline or diesel generator to recharge the battery. In a series-hybrid system, the engine drives an electric generator instead of directly driving the wheels. The generator provides power for the driving motors. In short, a series-hybrid is driven only by the motor.

Parallel hybrids may be a traditional style in which an engine and motor are coupled at an axis in parallel such that the speeds at this axis are identical, or directly proportional to each other by reduction or offset gearing, so that the supplied torques are added together on the same output shaft. When only one of the two sources is being used, the other must either rotate in an idling manner or be disconnected by a clutch. The two sources may be applied directly to the same shaft, and as such the speeds in this configuration are equal and the torques are cumulative when entering the transmission. The motor adds or subtracts torque to the system depending on whether it is consuming current (driving the vehicle) or producing current (charging a battery).

Parallel hybrids may also be a power-split style, also sometimes referred to as a series-parallel hybrid. The power-split hybrid allows for either source to provide all of the power separately or for the sources to provide varying amounts of power at the same time to provide the needed power at the wheels. This system usually has two generators, one similar to that of the generator connected to the engine in a series system, and the other being that of a traction motor/generator found in a parallel system. The output shafts from the engine and the traction motor may be combined by a series of gearing which does not require a disconnect clutch.

Hybrid vehicles may also incorporate an automatic transmission in the driveline between one or more of the sources and the drive wheels. An automatic transmission, also called an automatic gearbox, can automatically shift to different gear ratios as the vehicle starts to move, freeing the driver from having to shift gears manually. Most automatic transmissions have a defined set of gear ranges, and are referred to as a step-ratio automatic transmission. A fundamentally different type of automatic transmission is the continuously variable transmission or CVT, which can smoothly and steplessly alter its gear ratio by varying the diameter of a pair of belt or chain-linked pulleys, wheels, or cones. Step-ratio automatic transmissions have predefined shift schedules traditionally mapped by using vehicle speed and driver torque demand or throttle position. The shift schedules are designed to allow an engine to run in a band of optimal engine speeds while providing the desired vehicle speed and final torque output.

For traditional parallel hybrids, for example with the motor being disposed between the engine and a transmission, the engine is typically connected to the driveline by an engaged disconnect clutch during hybrid drive. The engine speed is then determined by the current vehicle speed and the current gear of the transmission when the engine engages. The current gear is selected by the shift schedule which is not optimized for the parallel powertrain configuration, especially when considering if the motor is in a traction mode consuming current from a battery or in a charging mode when providing current to the battery. From an energy management point of view, the engine speed and the motor speed are critical factors to determine the overall system efficiency. Thus it is desirable to have the freedom to move the engine speed in order for the system to operate more efficiently.

SUMMARY

In one embodiment, a hybrid vehicle includes a motor/generator, a transmission, and at least one controller programmed to shift the transmission according to a first shift schedule based on the motor/generator producing current, and shift the transmission according to a second shift schedule based on the motor/generator consuming current.

In another embodiment, a method of modifying a shift schedule of a transmission in a hybrid vehicle includes (i) by a controller, shifting a transmission according to a first shift schedule based on a motor/generator producing current, and (ii) by the controller, shifting the transmission according to a second shift schedule based on the motor/generator consuming current.

In yet another embodiment, a vehicle includes an engine, a transmission capable of shifting between predetermined gear ratios, a motor including a rotor, and a controller. The controller is programmed to shift the gear ratio of the transmission to cause a speed of the rotor to approach a target rotor speed selected according to a magnitude of a driver torque demand and whether the motor is consuming or producing current.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
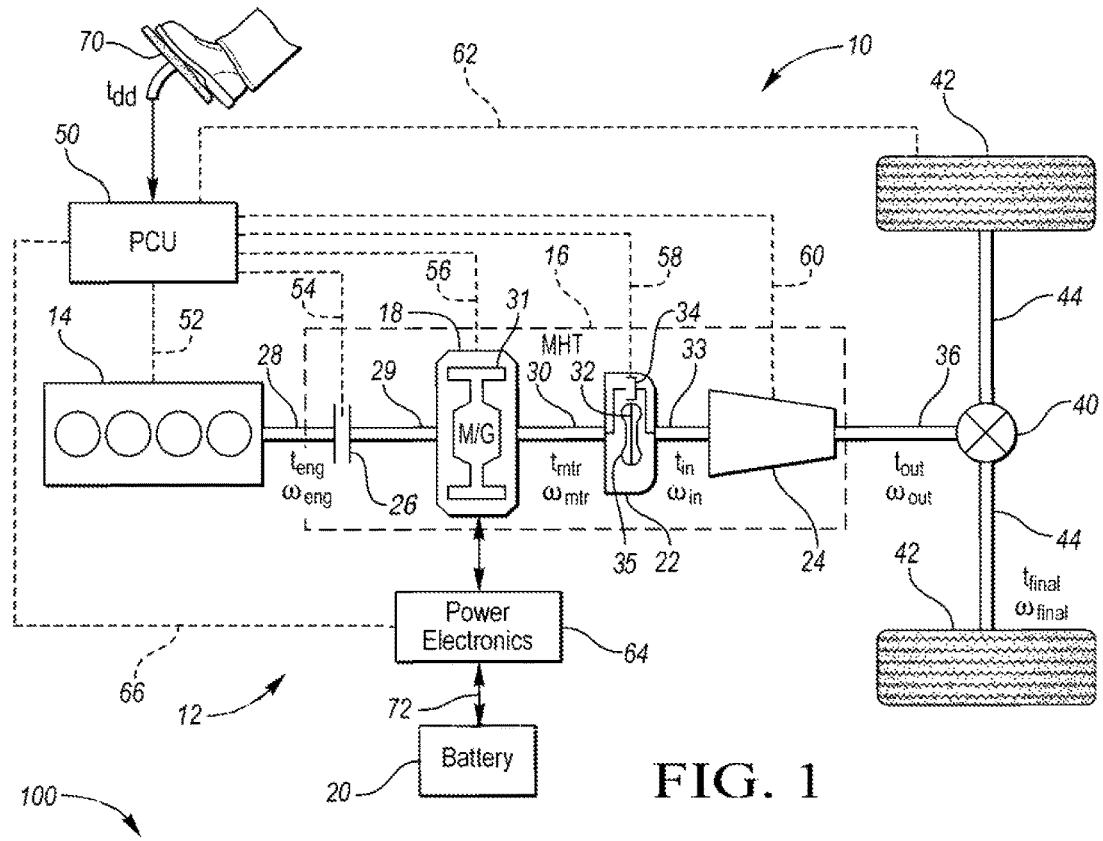
FIG. 1 is a diagrammatic illustration of a powertrain of a parallel hybrid vehicle.

FIG. 1 shows a schematic diagram of a hybrid electric vehicle (HEV) 10 and illustrates representative relationships among some of the components of the vehicle 10. Physical placement and orientation of the components within the vehicle 10 may vary. The vehicle 10 is shown as a traditional parallel hybrid powertrain 12. The powertrain 12 includes an engine 14 that drives a transmission system 16, which may also be referred to as a modular hybrid transmission (MHT) 16. Transmission system 16 includes an electric machine such as an electric motor/generator (M/G) 18, hereinafter simply referred to as a motor 18, coupled to an associated traction battery 20, a torque converter 22, and an automatic transmission 24. A disconnect clutch 26 may also be part of the transmission system 16, as shown here, or may be housed outside of the transmission system 16.

The engine 14 and the motor 18 are both drive sources for the vehicle 10. The engine 14 generally represents a power source that may include an internal combustion engine such as a gasoline, diesel, or natural gas powered engine. The engine 14 generates an engine power and corresponding engine torque, $t_{eng}$, that is supplied to the transmission system 16 when the disconnect clutch 26 between the engine 14 and the motor 18 is at least partially engaged. The engine 14 also has an engine speed, $\omega_{eng}$, when operating. The engine 14 may have a crankshaft 28, or engine output shaft 28, that provides the engine torque, $t_{eng}$, and has the an engine speed, $\omega_{eng}$.

When the disconnect clutch 26 is at least partially engaged, power flow from the engine 14 to the motor 18 or from the motor 18 to the engine 14 is possible. For example, the disconnect clutch 26 may be engaged and motor 18 may operate as a generator to convert rotational energy provided by the engine output shaft 28 and a motor input shaft 29 into electrical energy to be stored in the battery 20. The disconnect clutch 26 may also be disengaged to isolate the engine 14 from the remainder of the powertrain 12 such that the motor 18 can act as the sole drive source for the vehicle 10. Motor input shaft 29 may extend through the motor 18 to a motor output shaft 30. The motor input shaft 29 and motor output shaft 30 may be a single unitary motor shaft 30. In this configuration, the motor 18 is continuously drivably connected to the shaft 30, whereas the engine 14 is drivably connected to the shaft 30 only when the disconnect clutch 26 is at least partially engaged.

The motor 18 may be implemented by any one of a plurality of types of electric machines. For example, motor 18 may be a permanent magnet synchronous motor. The motor 18 may have an armature or rotor 31 connected to the motor shaft 30. The motor 18 generates a motor power and corresponding motor torque, $t_{mtr}$, that is supplied to the transmission system 16 when the motor 18 consumes current provided by the battery 20. The motor 18 has a speed, $\omega_{mtr}$, which may be referred to as a rotor 31 speed, $\omega_{mtr}$, or as a motor shaft 30 speed, $\omega_{mtr}$. The speed of the engine 14, $\omega_{eng}$, and the speed of the motor, $\omega_{mtr}$, will be equal when the disconnect clutch 26 is fully engaged, and may be referred to as the engine/motor speed, $\omega$.

The motor 18 is connected to the torque converter 22 via shaft 30. The torque converter 22 is therefore connected to the engine 14 when the disconnect clutch 26 is at least partially engaged. The torque converter 22 includes an impeller 35 fixed to motor shaft 30 and a turbine 32 fixed to a transmission input shaft 33. The torque converter 22 provides a hydraulic coupling between shaft 30 and transmission input shaft 33. The torque converter 22 transmits power from the impeller 35 to the turbine 32 when the impeller 35 rotates faster than the turbine 32. The magnitude of the turbine torque generally depends upon the relative speeds. When the ratio of impeller speed to turbine speed is sufficiently high, the turbine torque is a multiple of the impeller torque. The output of the torque converter 22 is the transmission input shaft 33 which transfers the transmission input torque, tin, and has a transmission input speed, $\omega_{in}$. Torque converter 22 may also be included within the transmission 24, and the transmission input shaft 33 may be an internal transmission shaft 24. The impeller 35, being connected to the motor output shaft 30 has the same speed as the motor, $\omega_{mtr}$.

A torque converter bypass clutch 34 (sometimes referred to as a lock-up clutch) may also be provided that, when engaged, frictionally or mechanically couples the impeller 35 and a turbine 32 of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the motor 18 and transmission 24 for applications that do not include a torque converter 22 or a torque converter bypass clutch 34. In some applications, disconnect clutch 26 is generally referred to as an upstream clutch and launch clutch (which may be a torque converter bypass clutch 34) is generally referred to as a downstream clutch.

The transmission 24 may be a step-ratio transmission 24 including discrete gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 33. The transmission 24 may also be a continuously variable transmission CVT 24, and the 'shifting' of the CVT 24 would entail varying input to output speed ratios. A CVT 24 may also be programmed to mimic a step-ratio transmission 24, and the methodology used here could 'shift' the CVT 24 from one simulated gear ratio into another simulated gear ratio. The transmission 24 then provides powertrain output torque, $t_{out}$, and speed, $\omega_{out}$, to transmission output shaft 36.

The output shaft 36 is shown connected to a differential 40. The differential 40 drives a pair of wheels 42 via respective axles 44 connected to the differential 40. The differential may transmit approximately equal torque, $t_{final}$, and speed, $\omega_{final}$, to each wheel 42 when the vehicle 10 is tracking straight. The differential 40 permits torque and speed differences between the wheels 42, such as when the vehicle turns a corner. Different types of differentials or similar devices may be used to distribute torque from the powertrain to one or more wheels. In some applications, torque distribution may vary depending on the particular operating mode or condition. Although the differential 40, wheels 42, and axles 44 resemble that of a solid axle rear wheel drive configuration, the figure is merely representative, the wheels 42 may be independently suspended, axles 44 may be half shafts including constant velocity joints, and the wheels 42 may be from a front wheel drive configuration or from a four-wheel drive configuration.

The powertrain 12 further includes an associated powertrain control unit (PCU) 50. While illustrated as one controller, the PCU 50 may be part of a larger control system and may be controlled by various other controllers throughout the vehicle 10, such as a vehicle system controller (VSC), an HEV energy management controller, and a transmission ratio manager controller, among others. It should therefore be understood that the PCU 50 and one or more other controllers can collectively be referred to as controller 50 that controls various actuators in response to signals from various sensors to control functions. For example, such as starting/stopping engine 14, operating motor 18 to consume current and provide wheel torque or produce current to charge battery 20, select or schedule transmission shifts, etc.

The controller 50 may communicate with various engine/vehicle sensors and actuators via an input/output (I/O) interface that may be implemented as a single integrated interface that provides various raw data, information, or signal conditioning, processing, and/or conversion, short-circuit protection, and the like. Alternatively, one or more dedicated hardware or firmware chips may be used to condition and process particular signals before being supplied to the CPU. The controller 50 may send signals to and receive signals from the engine 14 via communication line 52, disconnect clutch 26 via communication line 54, motor 18 via communication line 56, launch clutch 34 and/or torque converter 22 via communication line 58, transmission 24 via communication line 60, drive wheels 42 via communication line 62, and other power electronics 64 via communication line 66, among others. Communication between the controller 50 and the components may be done through hard wire or wirelessly. Communication may not be direct and may go through other systems. For example, the controller may receive engine torque, $t_{eng}$, and engine speed, $\omega_{eng}$, directly from a crankshaft position or speed sensor (not shown) or engine torque transducer (not shown) via hard wired communication lines 52, or from a vehicle communication system such as a CAN Bus (not shown). Similarly, the powertrain 12 may have speed sensors and torque sensors located at each of the above mentioned components, such as a motor rotor speed sensor (not shown), a torque converter impeller speed sensor (not shown) and wheel speed sensors (not shown).

As well, although not explicitly illustrated, various additional functions or components that may be controlled by controller 50 such as fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, motor operation, clutch pressures for disconnect clutch 26, launch clutch 34, and a shift schedule for the transmission 24, and the like. Sensors communicating input through the I/O interface may be used to indicate turbocharger boost pressure, crankshaft position (PIP), engine rotational speed, wheel speeds, vehicle speed, coolant temperature, intake manifold pressure (MAP), accelerator pedal position, ignition switch position, throttle valve position, air temperature, exhaust gas oxygen, or other exhaust gas component concentration or presence, intake air flow, transmission gear, ratio, or mode, transmission oil temperature, torque converter turbine speed, torque converter bypass clutch 34 status, deceleration or shift mode, and motor speed, for example.

An accelerator pedal 70 is used by the driver of the vehicle 10 to provide a driver torque demand, $t_{dd}$, or drive command to propel the vehicle. In general, depressing and releasing the pedal 70 generates an accelerator pedal position signal that may be interpreted by the controller 50 as a demand for increased power (or torque) or decreased power (or torque), respectively. Based at least upon input from the pedal 70, the controller 50 commands torque from the engine 14, $t_{eng}$, and/or the motor 18, $t_{mtr}$. The controller 50 also controls the timing of gear shifts within the transmission 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller 35 and the turbine 32. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the motor 18, and then from the motor 18 through the torque converter 22 and transmission 24. The motor 18 may assist the engine 14 by providing additional power to turn the shaft 30. This operation mode may be referred to as a "hybrid mode" or an "electric assist mode."

To drive the vehicle with the motor 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 72 to power electronics 64 that may include an inverter, for example. The power electronics 64 may be used to convert DC voltage from the battery 20 into AC voltage to be used by the motor 18. The controller 50 may command the power electronics 64 to convert voltage from the battery 20 to an AC voltage provided to the motor 18 to provide positive or negative torque to the shaft 30. This operation mode may be referred to as an "electric only" operation mode.

In any mode of operation, the motor 18 may provide a driving torque or a braking torque for the powertrain 12. The motor 18 may act as a generator and convert kinetic energy from the powertrain 12 into electric energy to be stored in the battery 20. The motor 18 may act as a generator while the engine 14 is providing propulsion power for the vehicle 10, for example. The motor 18 may additionally act as a generator during times of regenerative braking in which rotational energy from spinning wheels 42 is transferred back through the transmission 24 and is converted into electrical energy for storage in the battery 20.

The engine 14 and the motor 18 of the vehicle 10, when in hybrid mode, are configured to provide the driver torque demand such that the driver torque demand is equal to the sum of the engine torque and motor torque ($t_{dd}=t_{eng}+t_{mtr}$), keeping in mind that the motor torque may be negative when in a charging mode. The engine speed and motor speed, when in hybrid mode are substantially equivalent to each other ($\omega=\omega_{eng}=\omega_{mtr}$).

As mentioned above, one aspect of this disclosure is directed to a controller 50 programmed to shift the transmission 24 to cause the motor impeller 31 speed, $\omega_{mtr}$, to approach a target impeller speed, $\omega_{target}$, to increase fuel economy in the parallel hybrid powertrain 12. In this aspect, the powertrain 12 has the engine 14 coupled with the transmission 24, the rotor 31 of the motor 18 coupled with the engine 14, and the controller 50 shifts the transmission according to a magnitude of a driver torque demand, $t_{dd}$, and whether the motor 18 is consuming or producing current.

The target rotor speed, $\omega_{target}$, may include a target rotor speed range, and the controller 50 may be programmed to shift the transmission 24 in response to the rotor speed, $\omega_{mtr}$, being outside of the target rotor speed range. An impeller speed, target impeller speed, and target impeller speed range may be substituted for the rotor speeds. The controller 50 may also be programmed to shift the transmission 24 in response to a change in the driver torque demand, $t_{dd}$. The controller 50 may also be programmed to shift the transmission 24 in response to a change in the motor 18 consuming or producing current. An example of the motor 18 consuming current is when the motor 18 uses power from the battery 20 to drive the vehicle and provide positive torque, $t_{mtr}$, to the powertrain 12. An example of the motor 18 producing current is when the motor 18 provides power to the battery 20 to recharge the battery 20 and provide negative torque, $t_{mtr}$, to the powertrain 12 (torque in the opposite direction of the engine torque).

The controller 50 may be programmed to shift the transmission 24 by shifting from an off-going gear ratio to an on-coming gear ratio, and the controller 50 may be further programmed to verify the on-coming gear ratio is capable of providing the driver torque demand, $t_{dd}$, before shifting the transmission 24. The controller 50 may also be further programmed to, in response to receiving an impeller speed, $\omega_{mtr}$, and a gear ratio, verify the gear ratio provides a nearest convergence of the received impeller speed, $\omega_{mtr}$, with the desired impeller speed, $\omega_{target}$.

Figure 3:
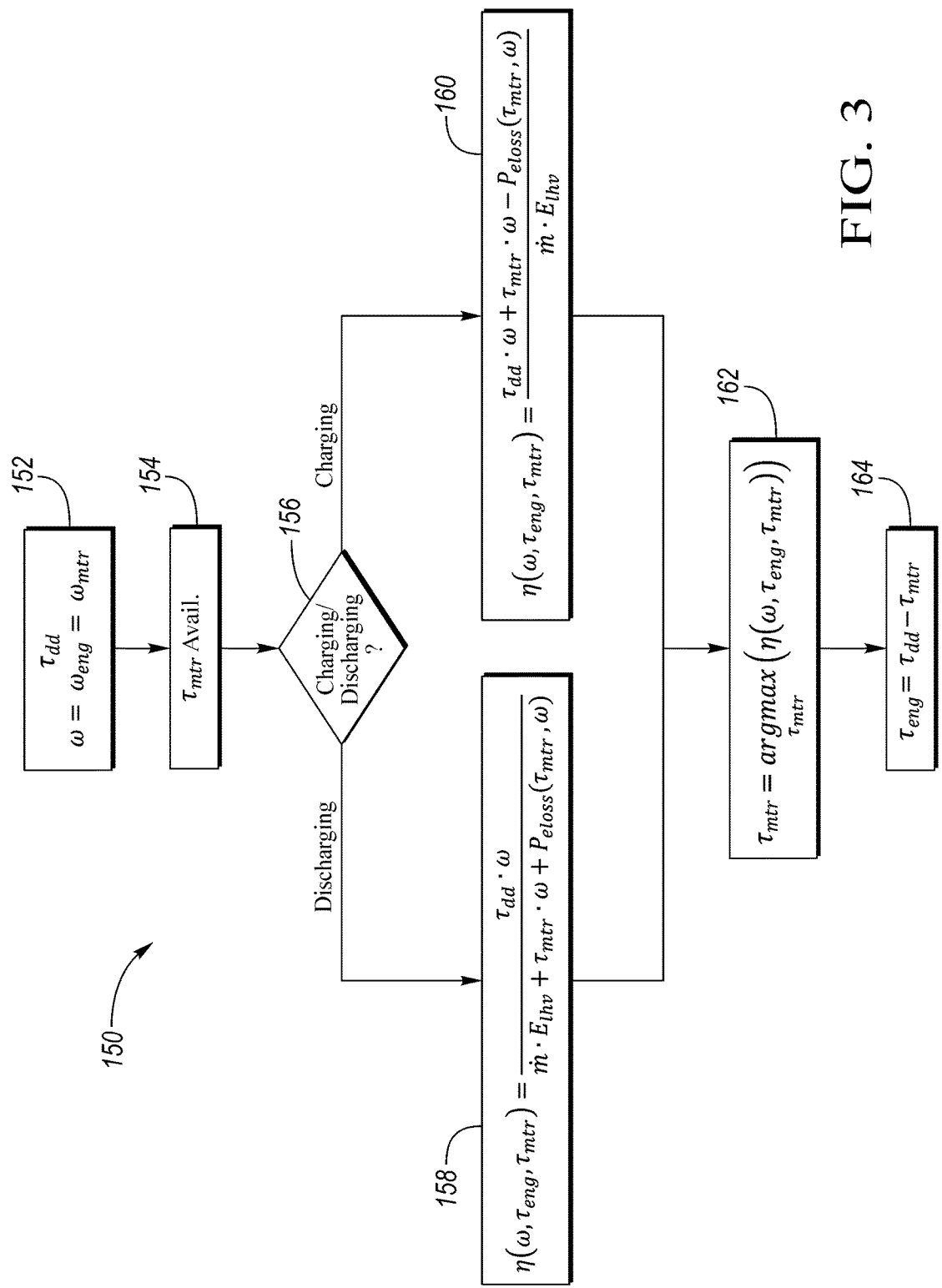
FIG. 3 is a flowchart illustrating an algorithm for selecting a target engine and motor torque.

The desired rotor or impeller speed, $\omega_{target}$, for fuel economy consideration, may be selected as a function of motor speed, $\omega_{mtr}$, engine torque, $t_{eng}$, being delivered to the powertrain 12, motor torque, $t_{mtr}$, being delivered to the powertrain 12, and an efficiency function based on the battery 20 being charged or discharged (see FIG. 3).

Figure 2:
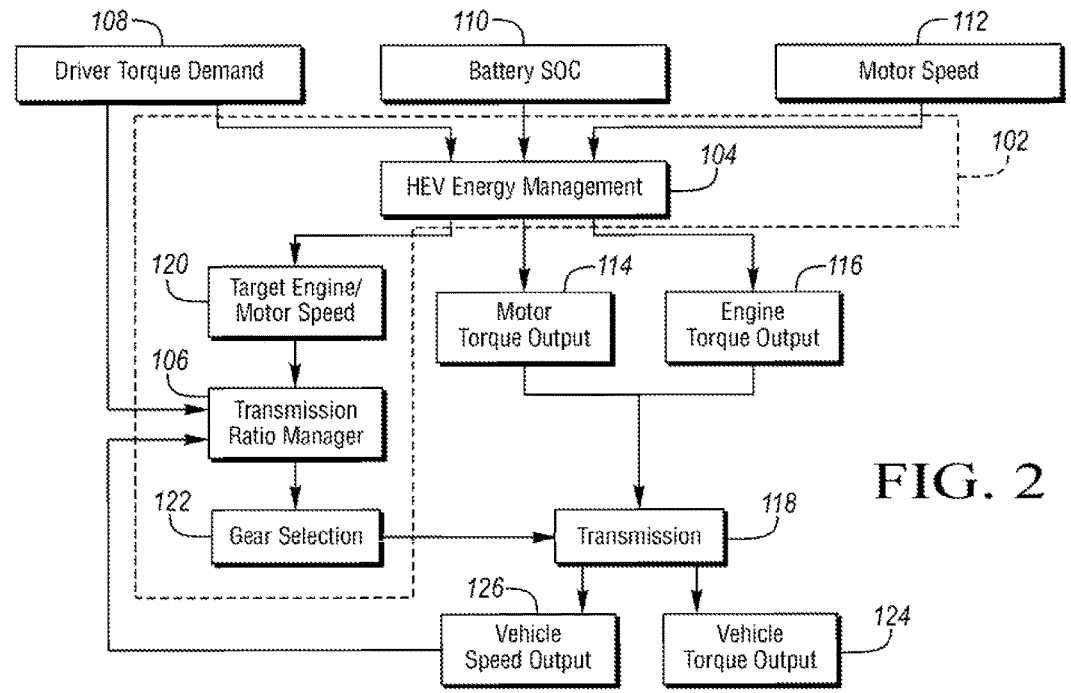
FIG. 2 is a block diagram illustrating energy management of a powertrain in a parallel hybrid vehicle.

FIG. 2 illustrates a potential energy management flow 100 for a hybrid vehicle such as that depicted in FIG. 1. A controller 102 may include an HEV energy management sub-component 104 and a transmission ratio manager sub-component 106. The energy management flow 100 is for a parallel hybrid powertrain having a hybrid mode in which an engine and motor both provide torque to the powertrain simultaneously and the motor speed is directly proportional to the engine speed. The controller 102 receives a driver torque demand, $t_{dd}$, as indicated by block 108, a battery state-of-charge, as indicated by block 110, and a motor speed, $\omega_{mtr}$, as indicated by block 112, in no particular order. The motor speed, $\omega_{mtr}$, may be provided by a sensor measuring impeller speed, motor output shaft speed, or impeller speed. As well, since the motor speed, $\omega_{mtr}$, is directly proportional to the engine speed, $\omega_{eng}$, when the disconnect clutch is fully engaged, the motor speed may also be provided by an engine speed measurement. Sensors for measuring crankshaft speed or engine output shaft speed may provide engine speed, $\omega_{eng}$, for example. Motor and engine speeds may also be determined by other means, such as current flow and engine timing, among others. However, an engine speed sensor could not provide the motor speed, $\omega_{mtr}$, when the disconnect clutch is not fully engaged, and thus when the powertrain is in an electric only mode and switching to a hybrid mode, the motor speed must be used to determine what the engine speed will be to provide for the most economical gear ratio when the engine comes on-line.

The controller 102 controls the motor to provide the required motor torque output component, as indicated at block 114, and engine torque output component, as indicated at block 116, such that the two of them combined meet the driver torque demand at block 108. These torques combine and flow into the transmission 118. The controller 102 selects a target engine speed for fuel economy based on the above inputs, as indicated at block 120. The controller 102 sends a signal to shift a transmission 118, as indicated by gear selection block 122, to cause the motor speed, $\omega_{mtr}$, to approach a target motor speed to increase fuel economy. The ultimate goal of the energy management flow 100 is to provide a vehicle output torque, as indicated at block 124, that meets the expectation of the driver while also providing the best shift schedule for the engine and the motor to provide the vehicle torque output. The controller may also monitor vehicle speed, as indicated at block 126 when selecting a gear ratio.

The controller 102 may be split into the HEV energy management sub-component 104 to receive the driver torque demand 108, battery state-of-charge 110, and motor speed 112 and output the controller motor and engine torques to the transmission and a target motor speed to the transmission ratio manager sub-component 106. It is then the transmission ratio manager sub-component 106 that provides the gear ratio selection and controls the transmission 188.

In practice, this management flow 100 is best seen when the hybrid vehicle is operating in electric only mode, having a vehicle speed and gear ratio already established. When a need for switching over to hybrid mode occurs in which the engine will come on-line and be included to provide the needed torque for the vehicle, the engine will need to match the motor speed when the disconnect clutch fully engages. This methodology would take in the current motor speed and driver torque demand, then check to see whether the motor will be adding torque to the powertrain (consuming current from a charged battery) or removing torque from the power train (charging the battery) to determine the needed engine torque to meet the driver demand. Upon knowing the needed engine torque to meet the driver demand, the methodology selects the most economical gear ratio for the engine to provide the driver torque demand at the most fuel economical speed. In other words, the methodology selects the gear ratio that would provide the closest engine speed to the target speed. This methodology ends with the shifting of the transmission to a new gear ratio based on these inputs.

The management flow 100 may include, before the step of sending a signal to shift the transmission 122, selecting a transmission gear ratio capable of delivering the driver torque demand, maintaining the battery state-of-charge, and providing a motor speed approaching the target motor speed.

Since the transmission 118 is a discrete step-ratio transmission, an exact target speed may not be achievable, so the controller may select a gear ratio that converges on the target speed or falls within a speed band. Thus the target motor speed may be a target motor speed range and the management flow 100 may include sending the signal to shift a transmission 122 when triggered by the motor speed 112 being outside of the target motor speed range. The management flow 100 may also include sending the signal to shift a transmission 122 when triggered by a change in the driver torque demand 108. The management flow 100 may include sending the signal to shift a transmission 122 when triggered by a change in the battery state-of-charge 110, or any combination of the above.

The management flow 100 of FIG. 2 also supports a method of modifying a shift schedule of a step-ratio transmission in a parallel hybrid powertrain. Upon receiving motor charging/discharging information 110, the method includes sending a first shift schedule to a transmission 122 in response to a motor charging 110, and sending a second shift schedule to a transmission 122 in response to a motor discharging 110.

The steps of sending a first or second shift schedule to a transmission 122 may be triggered by an impeller or rotor speed being outside of the target impeller or rotor speed range for increased fuel economy 112. The steps of sending a first or second shift schedule to a transmission 122 may also be triggered by a change in the driver torque demand 108. Alternatively, the steps of sending a first or second shift schedule to a transmission 122 may be triggered by a change in the motor charging/discharging 110, or any combination of the above.

This method may also include, upon receiving an impeller or rotor speed 112 and a driver torque demand 108, sending a signal 122 to deviate from the first or second shift schedule to shift the transmission 118 to cause a speed of an impeller to approach a target impeller speed selected according to a magnitude of a driver torque demand and whether the motor is consuming or producing current to increase fuel economy.

FIG. 3 is a flowchart 150 illustrating an algorithm for selecting a target engine and motor torque, $t_{eng}$, $t_{mtr}$. The parallel hybrid powertrain in the hybrid mode has the engine and motor coupled together such that the two combined have the same speed and their respective output torques are cumulative. The driver demand torque, $t_{dd}$, may be provided by an operator, as illustrated in activity box 152. The current engine and motor speed, ω, may also be obtained at activity box 152.

The motor may have a range of torque availability depending on the state-of-charge. For example, if the motor is charging the battery, the motor may provide differing rates of battery recharging depending on need; the greater battery charge rate may require a higher torque load, where as a lower battery charge rate may be accomplished at a lower torque load. Similarly, if the motor is discharging the battery, the motor may discharge the battery faster and provide a higher motor torque into the powertrain or the motor may discharge the battery slower and provide a lower motor torque contribution into the powertrain. The range of motor torque availability may be subject to the state-of-charge, the battery power charge and discharge rate limits, and the amount of available charge in the battery. The range of motor torque availability is provided to the algorithm at activity box 154.

The algorithm diverges at decision diamond 156, and follows either a discharging or charging path. If the battery is discharging (if current is flowing to the motor and the motor is adding positive torque to the powertrain), then the efficiency equation in activity box 158 is followed. If the battery is charging (if motor is removing torque from the powertrain to provide current to the battery), then the efficiency equation in activity box 160 is followed. Following either path returns the flowchart 150 to activity box 162 in which the optimal motor torque equation (argument of the maximum of the differing efficiency equations) is implemented.

Activity box 162 provides the target motor torque based on the charging or discharging efficiency equations, provided at 158 and 160, bounded by the available motor torque provided at 154. The optimal engine torque, $t_{eng}$, is then provided as the difference between the driver demand torque and the motor torque at activity box 164. Using the algorithm 150, the controller may modulate the motor and engine torques to provide the highest combined efficiency to drive the powertrain at any given speed.

It should be noted that the motor speed and engine speed being equal and the motor torque and engine torque being cumulative in order to supply the driver demand torque are both taken into account in the efficiency equations. When a new driver demand torque is selected, the algorithm 150 may be run to determine the most optimal combination of engine and motor torques depending on the state-of-charge and the speed, and thus a change in driver demand torque may trigger the algorithm. Similarly, a change in speed may trigger the algorithm, which may occur when the transmission shifts, and thus a transmission shift my trigger the algorithm. As well, if the battery charge level changes to a point where the charge rate range may change, and thus the available motor torque may change, the algorithm may also be triggered.

Figure 4:
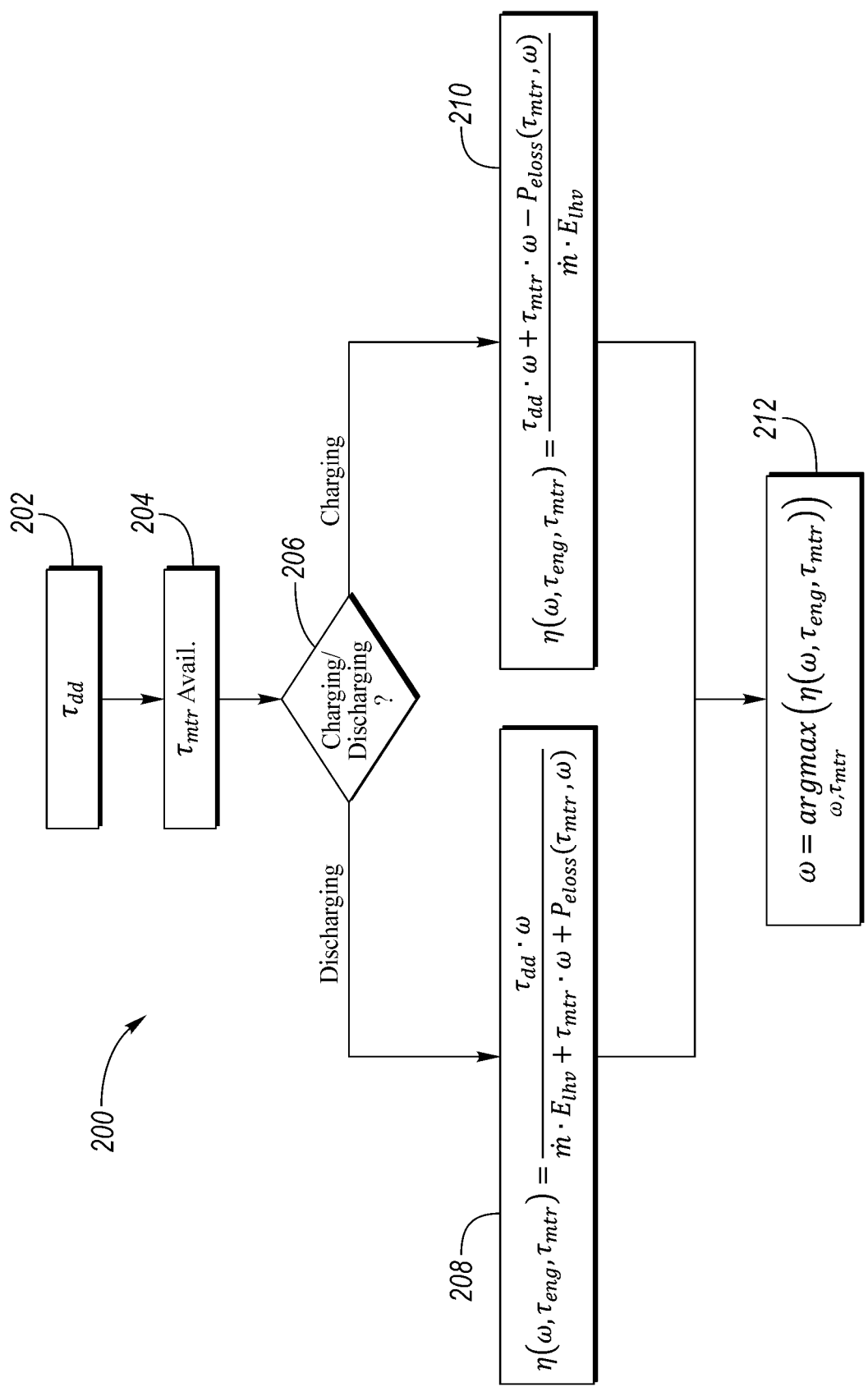
FIG. 4 is a flowchart illustrating an algorithm for selecting a target motor speed.

FIG. 4 is a flowchart 200 illustrating an algorithm for selecting a target motor speed, ω, for the most efficient system. The parallel hybrid powertrain in the hybrid mode has the engine and motor coupled together such that the two combined have the same speed and their respective output torques are cumulative. The driver demand torque, $t_{dd}$, may be provided by an operator, as illustrated in activity box 202. The range of motor torque availability is provided to the algorithm at activity box 204.

The algorithm 200 diverges at decision diamond 206 and follows either a discharging or charging path. If the battery is discharging (if current is flowing to the motor and the motor is adding positive torque to the powertrain), then the efficiency equation in activity box 208 is followed. If the battery is charging (if motor is removing torque from the powertrain to provide current to the battery), then the efficiency equation in activity box 210 is followed. Following either path returns the flowchart 150 to activity box 212 in which the optimal motor speed equation (argument of the maximum of the differing efficiency equations) is implemented.

The controller may then send the optimal motor speed, ω, to a transmission ratio manager. The transmission ratio manager may then assess whether the driver torque demand $t_{dd}$, may be achieved at the optimal motor speed, ω, and to which gear may provide that speed. Similar to above, a change in driver torque demand, state-of-charge, engine/motor speed, a transmission shift, and available motor torque may each be a trigger to run the algorithm 200.

The result from algorithm 200 provides an optimal motor speed for a given driver torque demand resulting in a recommendation to a transmission ratio manger to shift gear to achieve that speed, and the results from algorithm 150 provide optimal engine and motor torques for a given motor speed and driver torque demand. The controller may utilize both algorithms 150 and 200 in parallel or in series to manage the overall efficiency of the hybrid powertrain.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of modifying a shift schedule of a transmission in a hybrid vehicle, comprising:
by a controller, shifting a transmission according to a first shift schedule based on a motor/generator producing current; and
by the controller, shifting the transmission according to a second shift schedule based on the motor/generator consuming current;
wherein either step of shifting is performed in response to an impeller speed being outside of a target impeller speed range.

2. The method of claim 1, wherein either step of shifting is performed in response to a change in driver torque demand.

3. The method of claim 1, wherein the step of shifting the transmission according to the first shift schedule is performed in response to the motor/generator changing from consuming current to producing current.

4. The method of claim 1, wherein the step of shifting the transmission according to the second shift schedule is performed in response to the motor/generator changing from producing current to consuming current.

5. The method of claim 1, further comprising deviating from the first or second shift schedule and shifting the transmission to cause a speed of an impeller to approach a target impeller speed selected according to a magnitude of a driver torque demand, a range of motor torque availability, and whether the motor is consuming or producing current.

6. A vehicle comprising:
an engine;
a transmission capable of shifting between predetermined gear ratios;
a motor including a rotor; and
a controller programmed to shift the gear ratio of the transmission to cause a speed of the rotor to approach a target rotor speed selected according to a magnitude of a driver torque demand and whether the motor is consuming or producing current.

7. The vehicle of claim 6, wherein the motor is selectively coupled to the engine and is configured to selectively provide drive torque.

8. The vehicle of claim 6, wherein the controller is further programmed to shift the transmission according to a first shift schedule based on the motor providing positive drive torque, and shift the transmission according to a second shift schedule based on the motor providing negative drive torque.

9. The vehicle of claim 6, wherein the target rotor speed is a function of the speed of the rotor, an engine torque, a motor torque, and whether the battery being charged or discharged.

* * * * *